United States Patent
Oh et al.

(10) Patent No.: US 9,412,313 B2
(45) Date of Patent: Aug. 9, 2016

(54) DISPLAY APPARATUS AND METHOD OF DRIVING THE SAME

(71) Applicant: Samsung Display Co., Ltd., Yongin, Gyeonggi-do (KR)

(72) Inventors: Won Sik Oh, Asan-si (KR); Jin-Taek Hong, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/531,230

(22) Filed: Nov. 3, 2014

(65) Prior Publication Data

US 2015/0049131 A1    Feb. 19, 2015

Related U.S. Application Data

(62) Division of application No. 13/169,252, filed on Jun. 27, 2011, now Pat. No. 8,902,264.

(30) Foreign Application Priority Data

Nov. 17, 2010 (KR) .................. 10-2010-0114552

(51) Int. Cl.
  G09G 3/34 (2006.01)
  G09G 3/36 (2006.01)
  H04N 13/04 (2006.01)
  G09G 3/00 (2006.01)
(52) U.S. Cl.
  CPC ............... G09G 3/342 (2013.01); G09G 3/003 (2013.01); G09G 3/3611 (2013.01); H04N 13/0438 (2013.01); H04N 13/0497 (2013.01); G09G 2310/08 (2013.01)
(58) Field of Classification Search
  None
  See application file for complete search history.

(56) References Cited

U.S. PATENT DOCUMENTS

| 6,448,952 B1 | 9/2002 | Toyoda et al. |
| 2010/0039456 A1 | 2/2010 | Um et al. |
| 2010/0066820 A1 | 3/2010 | Park et al. |
| 2010/0128495 A1* | 5/2010 | Wang ................... G02B 6/0038 362/620 |
| 2010/0238274 A1 | 9/2010 | Kim et al. |
| 2011/0032439 A1 | 2/2011 | Robinson et al. |
| 2011/0254932 A1 | 10/2011 | Doung |
| 2011/0292041 A1* | 12/2011 | Lee .................... G02B 27/2264 345/419 |

FOREIGN PATENT DOCUMENTS

| CN | 101052134 A | 10/2007 |
| JP | 2001125547 A | 5/2001 |

(Continued)

*Primary Examiner* — Kent Chang
*Assistant Examiner* — Benjamin Morales Fernande
(74) *Attorney, Agent, or Firm* — Cantor Colburn LLP

(57) ABSTRACT

A display apparatus includes a display panel including n×m array of pixels and which sequentially drives the pixels from pixels in a first row to pixels in an n-th row, a panel driving circuit which sequentially applies first, second, third or fourth image data to the display panel, a backlight unit including a first light source disposed adjacent to the pixels in the first row and a second light source disposed adjacent to the pixels in the n-th row, and a backlight control circuit which divides each of first and second time periods into first, second, third and fourth blinking time periods, and applies a control signal to the backlight unit, where the first time period corresponds to two frames during which the first and second image data are applied, and the second time period corresponds to two frames during which the third and fourth image data are applied.

8 Claims, 16 Drawing Sheets

(56) References Cited

FOREIGN PATENT DOCUMENTS

| | | |
|---|---|---|
| JP | 2001126521 A | 5/2001 |
| JP | 2002006789 A | 1/2002 |
| JP | 2002050498 A | 2/2002 |
| JP | 2003228352 A | 8/2003 |
| JP | 2005024627 | 1/2005 |
| JP | 2007219070 A | 8/2007 |
| JP | 2009086026 A | 4/2009 |
| JP | 2009175346 | 8/2009 |
| JP | 2009288448 A | 12/2009 |
| KR | 1020100020326 A | 2/2010 |
| TW | 200419467 A | 10/2004 |
| WO | 2009010500 A1 | 1/2009 |
| WO | 2010107227 A2 | 9/2010 |

\* cited by examiner

DISPLAY APPARATUS AND METHOD OF DRIVING THE SAME

This application is a divisional of U.S. patent application Ser. No. 13/169,252, filed on Jun. 27, 2011, claims priority to Korean Patent Application No. 10-2010-0114552, filed on Nov. 17, 2010, and all the benefits accruing therefrom under U.S.C. §119, the content of which in its entirety is herein incorporated by reference.

BACKGROUND OF THE INVENTION (1) Field of Disclosure

Exemplary embodiments of the present invention relate to a display apparatus and a method of driving the display apparatus. More particularly, exemplary embodiments of the present invention relate to a display apparatus with improved display characteristics and a method of driving the display apparatus.

(2) Description of the Related Art

In general, a three-dimensional image display apparatus alternately displays a left-eye image and a right-eye image on a display panel thereof to display a three-dimensional image. However, a cross-talk phenomenon occurs when the image displayed on the display panel is changed from the left-eye image to the right-eye image or vice versa, and an image display quality is thereby deteriorated.

In addition, brightness on the display panel may vary depending on characteristics of the display panel and a backlight unit, which is typically included in the three-dimensional image display apparatus.

BRIEF SUMMARY OF THE INVENTION

Exemplary embodiments of the present invention provide a display apparatus with improved display characteristics.

Exemplary embodiments of the present invention provide a method of driving the display apparatus.

In an exemplary embodiment, a display apparatus includes a display panel, a panel driving circuit, a backlight unit and a backlight control circuit. The display panel includes n row by m column array of pixels and sequentially drives the pixels from pixels in a first row to pixels in an n-th row to display an image, where each of n and m is an integer greater than or equal to 2. The panel driving circuit applies at least one of a first image data, a second image data, a third image data and a fourth image data to the display panel during a frame unit such that the first image data, the second image data, the third image data and the fourth image data are sequentially applied to the display panel. The backlight unit provides light to the display panel, and the backlight unit includes a first light source disposed substantially parallel to and adjacent to the pixels in the first row and a second light source disposed adjacent to the pixels in the n-th row and opposite to the first light source. The backlight control circuit divides each of a first time period and a second time period into a first blinking time period, a second blinking time period, a third blinking time period and a fourth blinking time period, and applies a control signal, which controls a blinking timing of the first light source and a blinking timing of the second light source, to the backlight unit, where the first time period corresponds to two frames during which the first image data and the second image data are applied, and the second time period corresponds to two frames during which the third image data and the fourth image data are applied. The first light source and the second light source are turned off during the first blinking time period, the first light source is turned on during the second blinking time period, the second light source is turned off during the second blinking time period, the first light source and the second light source are turned on during the third blinking time period, the first light source is turned off during the fourth blinking time period, and the second light source is turned on during the fourth blinking time period.

In an alternative exemplary embodiment, a display apparatus includes a display panel, a panel driving circuit, a backlight unit and a backlight control circuit. The display panel includes n row by m column array of pixels and sequentially drives the pixels from pixels in a first row to pixels in an n-th row to display an image, where each of n and m is an integer greater than or equal to 2. The panel driving circuit applies at least one of a first image data, a second image data, a third image data and a fourth image data to the display panel during a frame unit such that the first image data, the second image data, the third image data and the fourth image data are sequentially applied to the display panel. The backlight unit includes a first light source disposed substantially parallel to and adjacent to the pixels in the first row and a second light source disposed adjacent to the pixels in the n-th row and opposite to the first light source, and the backlight unit provides a light to the display panel. The backlight control circuit each of a first time period and a second time period into a first blinking time period, a second blinking time period and a third blinking time period, and applies a control signal to the backlight unit to control a blinking timing of the first light source and the second light source, where the first time period corresponds to two frames during which the first image data and the second image data are applied, and the second time period corresponds to two frames during which the third image data and fourth image data are applied. The first light source and the second light source are turned off during the first blinking time period, the first light source is turned on during the second blinking time period, the second light source is turned off during the second blinking time period, the first light source is turned off during the third blinking time period, the second light source is turned on during the third blinking time period, and the first blinking time period is shorter than each of the second blinking time period and the third blinking time period.

In an alternative exemplary embodiment, a display apparatus includes a display panel, a panel driving circuit, a backlight unit and a backlight control circuit. The display panel includes n row by m column array of pixels and sequentially drives the pixels from pixels in a first row to pixels in an n-th row to display an image, where each of n and m is an integer greater than or equal to 2. The panel driving circuit applies at least one of a first image data, a second image data, a third image data and a fourth image data to the display panel during a frame unit such that the first image data, the second image data, the third image data and the fourth image data are sequentially applied to the display panel. The backlight unit includes a first light source disposed substantially parallel to and adjacent to the pixels in the first row and a second light source disposed adjacent to the pixels in the n-th row and opposite to the first light source, and the backlight unit provides a light to the display panel. The backlight control circuit divides a first time period and a second time period into a first blinking time period, a second blinking time period, a third blinking time period and a fourth blinking time period, where the first time period corresponds to two frames during which the first image data and the second image data are applied, and the second time period corresponds to two frames during which the third image data and the fourth image data are applied. The first light source is turned off during the first blinking time period, the second light source is turned on during the first blinking time period, the first light source is turned on during the second blinking time period, the second light source is turned off during the second blinking time period, the first light source and the second light source are turned on during the third blinking time period, the first light source is turned off during the fourth blinking time period, the second light source is turned on during the fourth blinking time period, and the third blinking time period is shorter than each of the second blink time period and the fourth blinking time period.

In an exemplary embodiment, a method of driving a display apparatus that provides an image data and a light from a light source to a display panel including n row by m column array of pixels to display, wherein each of n and m is an integer greater than or equal to 2, includes: measuring a brightness on a display surface of the display panel by providing image data corresponding to a same gray scale to each pixel and the light to the display panel; detecting a high brightness horizontal stripe area based on the measured brightness of the display surface, where the high brightness horizontal stripe appears substantially parallel to the pixels in a pixel row and has the brightness higher than a predetermined brightness; and maintaining the light source in turn-off state during a predetermined time in a time period, during which the image data is displayed through the pixels corresponding to the high brightness horizontal stripe area, and maintaining the light source in turn-on state during a time in the time period different from the predetermined time of the time period, during which the image data is displayed through the pixels corresponding to the high brightness horizontal stripe area.

In an exemplary embodiment, the cross-talk phenomenon in which the left-eye image data and the right-eye image data are mixed with each other is effectively prevented from occurring, and the high-brightness horizontal stripes caused by non-uniform brightness on the display surface is effectively prevented from being perceived.

BRIEF DESCRIPTION OF THE DRAWINGS

The above and other aspects and features of the invention will become readily apparent by describing in further detail exemplary embodiments thereof with the accompanying drawings, in which.

DETAILED DESCRIPTION OF THE INVENTION

Figure 1:
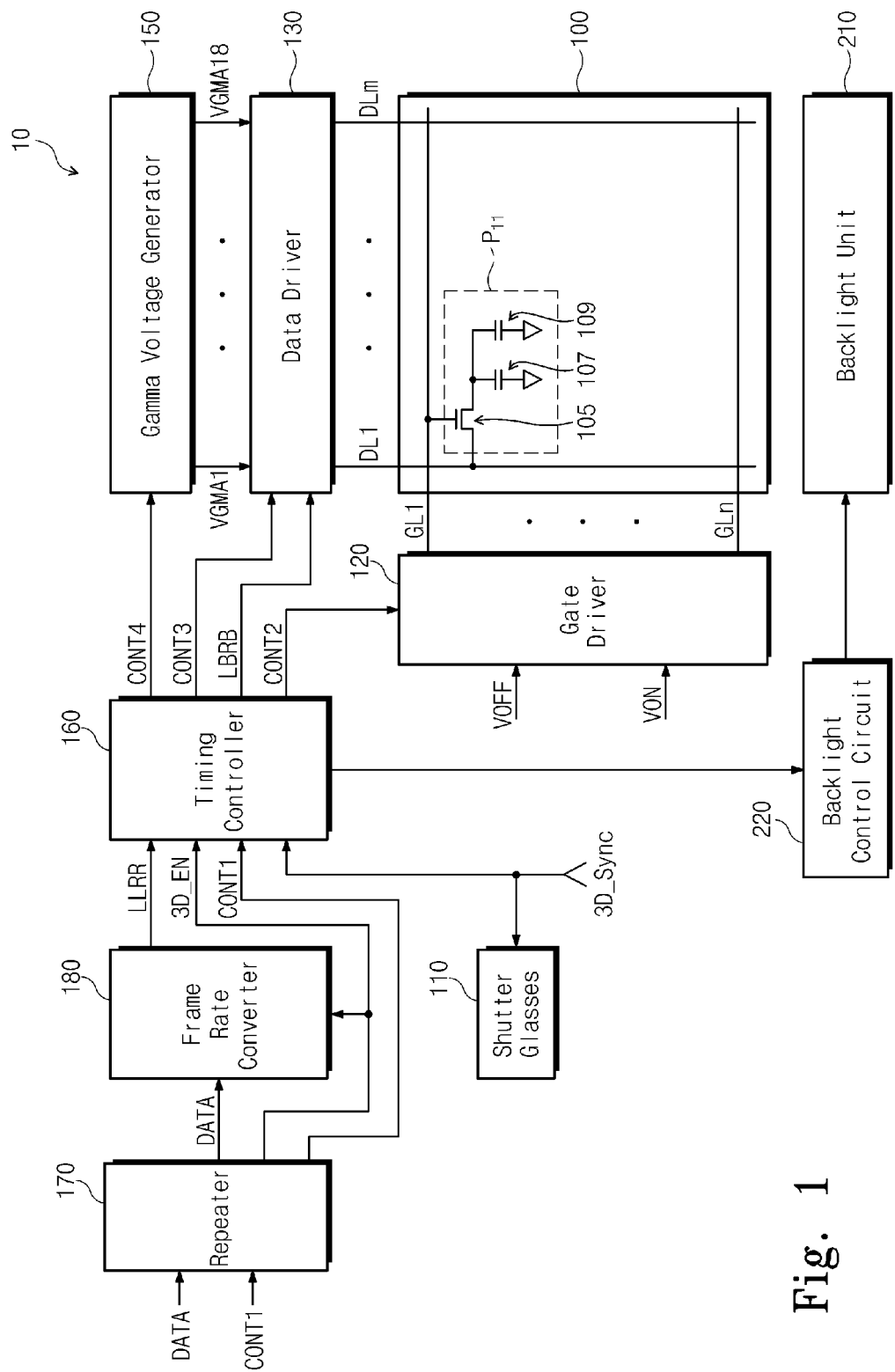
FIG. 1 is a block diagram showing an exemplary embodiment of a display apparatus according to the present invention.

The invention now will be described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, then elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the present invention will be explained in detail with reference to the accompanying drawings.

FIG. 1 is a block diagram showing an exemplary embodiment of a display apparatus according to the present invention.

Referring to FIG. 1, a display apparatus 10 includes a display panel 100 that displays an image, a gate driver 120 and a data driver 130 which drive the display panel 100, a gamma voltage generator 150 connected to the data driver 130, a timing controller 160 that controls the gate and data drivers 120 and 130, a backlight unit 210 that provides light to the display panel 100, and a backlight control circuit 220 that controls a light-emitting timing of the backlight unit 210.

The display apparatus 10 may further include a repeater 170, a frame rate converter 180 and shutter glasses 110.

The repeater 170 receives a two-dimensional (hereinafter, referred to as "2-D") image signal DATA or a three-dimensional (hereinafter, referred to as "3-D") image signal (not shown) from external video system (not shown). The repeater 170 transmits the two-dimensional image signal DATA or the three-dimensional image signal to the frame rate converter 180.

When the 2-D image signal is applied to the frame rate converter 180 from the repeater 170, the frame rate converter 180 converts the 2-D image signal DATA into the 3-D image signal in response to a 3-D enable signal 3D_EN and changes the frame rate of the converted 3-D image signal to correspond to the frame rate of the display panel 100. In an exemplary embodiment, the frame rate converter 180 divides the 2-D image signal DATA having a frequency of about 60 hertz (Hz) into a left-eye image frame (hereinafter, referred to as "left-eye image data") L and a right-eye image frame (hereinafter, referred to as "right-eye image data") R to generate the 3-D image signal and converts the 3-D image signal into a quad-speed image signal LLRR having a frequency of about 240 Hz. In an exemplary embodiment, the frame rate converter 180 may convert the 3-D image signal into the quad-speed image signal LLRR having various frequencies, for example, 120 Hz, 360 Hz, etc. In an exemplary embodiment, the four-time image signal LLRR may have the frequency of about 240 Hz, and a time duration, during which each frame of the quad-speed image signal LLRR is output, is about $\frac{1}{240}$ seconds.

Although not shown in FIG. 1, when a 2-D enable signal is applied to the frame rate converter 180 from the repeater 170, the frame rate converter 180 may output the 2-D image signal DATA without converting the 2-D image signal DATA into the 3-D image signal.

In such an embodiment, the frame rate converter 180 generates a double-speed image signal by dividing the 2-D image signal DATA from the repeater 170 into the left-eye image data L and the right-eye image data R to output the quad-speed image signal LLRR. Then, the frame rate converter 180 generates another left-eye image data L succeeding, the left-eye image data L and another right-eye image data R succeeding, the right-eye image data R. Thus, the frame rate converter 180 may convert the double-speed image signal into the quad-speed image signal LLRR.

Although not shown in FIG. 1, when the 3-D image signal is applied to the frame rate converter 180 from the repeater 170, the frame rate converter 180 changes the frame rate of the 3-D image signal to correspond to the frame rate of the display panel 100 and outputs the converted 3-D image signal to the display panel 100.

The timing controller 160 receives the quad-speed image signal LLRR from the frame rate converter 180 and receives a control signal CONT1 from the repeater 170. The timing controller 160 converts each of one of the two left-eye image data L of the quad-speed image signal LLRR and one of the two right-eye image data R of the quad-speed image signal LLRR into a black image data B and outputs the converted quad-speed image signal LBRB. The timing controller 160 may compensate for the image signal LBRB through a data compensation method to compensate for a charge rate of each pixel.

The control signal CONT1 applied to the timing controller 160 may include a main clock signal, a vertical synchronization signal, a horizontal synchronization signal and a data enable signal. The timing controller 160 generates a gate control signal CONT2 and a data control signal CONT3 based on the control signal CONT1 and applies the gate control signal CONT2 and the data control signal CONT3 to the gate driver 120 and the data driver 130, respectively, to control operations of the gate and data drivers 120 and 130.

As shown in FIG. 1, the timing controller 160 receives the 3-D enable signal 3D_EN from the repeater 170 and generates a gamma selection control signal CONT4 in response to the 3-D enable signal 3D_EN. The gamma selection control signal CONT4 is applied to the gamma voltage generator 150. When the gamma selection control signal CONT4 in a high level is applied to the gamma voltage generator 150, the gamma voltage generator 150 outputs 3-D gamma reference voltages in response to the gamma selection control signal CONT4 in the high level. In an exemplary embodiment, the 3-D gamma reference voltages may include a first 3-D gamma reference voltage VGMA1 to an eighteenth 3-D gamma reference voltage VGMA18, for example, but not being limited thereto.

Although not shown in FIG. 1, when the 2-D enable signal is applied to the timing controller 160, the gamma selection control signal CONT4 in a low level is applied to the gamma voltage generator 150. Thus, the gamma voltage generator 150 may output 2-D gamma reference voltages having levels different from the levels of the 3-D gamma reference voltages VGMA1 to VGMA18 in response to the gamma selection control signal CONT4 in the low level.

In addition, the timing controller 160 receives a 3-D synchronization signal 3D_Sync from the video system to change an inversion period of a polarity inversion signal which may be used to control a polarity of the left-eye data voltage and the right-eye data voltage, and applies the polarity inversion signal to the data driver 130. In an exemplary embodiment, when the 2-D synchronization signal is generated, the timing controller 160 changes the inversion period of the polarity inversion signal to a unit frame, and the timing controller 160 changes the inversion period of the polarity inversion signal to two frames when the 3-D synchronization signal 3D_Sync.

The display panel 100 includes a plurality of gate lines GL1 to GLn to which a gate voltage is applied and a plurality of data lines DL1 to DLm to which a data voltage is applied. The display panel 100 includes a plurality of pixel areas defined by the gate lines GL1 to GLn and the data lines DL1 to DLm, and each pixel area includes a pixel.

In an exemplary embodiment, the pixels may have the same structure and function, and thus, a single pixel $P_{11}$ has been shown in FIG. 1 for the convenience of explanation.

The pixel $P_{11}$ includes a thin film transistor 105, a liquid crystal capacitor 107 and a storage capacitor 109. The thin film transistor 105 includes a gate electrode connected to a first gate line GL1, a source electrode connected to a first data line DL1, and a drain electrode connected to the liquid crystal capacitor 107 and the storage capacitor 109. The liquid crystal capacitor 107 and the storage capacitor 109 are connected to the drain electrode in parallel.

Although not shown in FIG. 1, the display panel 100 may include a first substrate, a second substrate disposed opposite to, e.g., facing, the first substrate and a liquid crystal layer interposed between the first substrate and the second substrate.

The first substrate includes the gate lines GL1 to GLn, the data lines DL1 to DLm, the thin film transistor 105, and a pixel electrode (not shown) that serves as a first electrode of the liquid crystal capacitor 107. The thin film transistor 105 applies the data voltage to the pixel electrode in response to the gate voltage.

The second substrate includes a common electrode (not shown) that serves as a second electrode of the liquid crystal capacitor 107, and a reference voltage is applied to the common electrode. The liquid crystal layer disposed between the pixel electrode and the common electrode serves as a dielectric substance. The liquid crystal capacitor 107 is charged with a voltage corresponding to an electric potential difference between the data voltage and the reference voltage.

The gate driver 120 is electrically connected to the gate lines GL1 to GLn disposed on the display panel 100 to apply the gate voltage to the gate lines GL1 to GLn. In an exemplary embodiment, the gate driver 120 generates gate signals including a gate-on voltage VON and a gate-off voltage VOFF in response to the gate control signal CONT2 from the timing controller 160 to drive the gate lines GL1 to GLn, and sequentially outputs the gate signals to the gate lines GL1 to GLn.

The data driver 130 receives the image data LBRB from the timing controller 160 and converts the left-eye image data L, the black image data B, and the right-eye image data R into the left-eye data voltage, the black data voltage, and the right-eye data voltage to provide the left-eye data voltage, the black data voltage, and the right-eye data to the display panel 100. Particularly, the data driver 130 may convert the left-eye image data L, the black image data B, and the right-eye image data R into the left-eye data voltage, the black data voltage, and the right-eye data voltage, respectively, based on the 3-D gamma reference voltages VGMA1 to VGMA18 from the gamma voltage generator 150.

The data driver 130 is electrically connected to the data lines DL1 to DLm disposed on the display panel 100, and applies the left-eye data voltage, the black data voltage, the right-eye data voltage and the black data voltage repeatedly to each of the data lines DL1 to DLm in a sequential matter, e.g., a sequence of the left-eye data voltage, the black data voltage, the right-eye data voltage and the black data voltage The display apparatus 10 further includes a shutter glasses 110 includes a left-eye shutter (not shown) and a right-eye shutter (not shown). The shutter glasses 110 receive the 3-D synchronization signal 3D_Sync and sequentially drive the left-eye shutter and the right-eye shutter in response to the 3-D synchronization signal 3D_Sync. When a user wears the shutter glasses 110, the user may perceive the 3-D image displayed on the display panel 100 through the left-eye shutter and the right-eye shutter.

Figure 2:
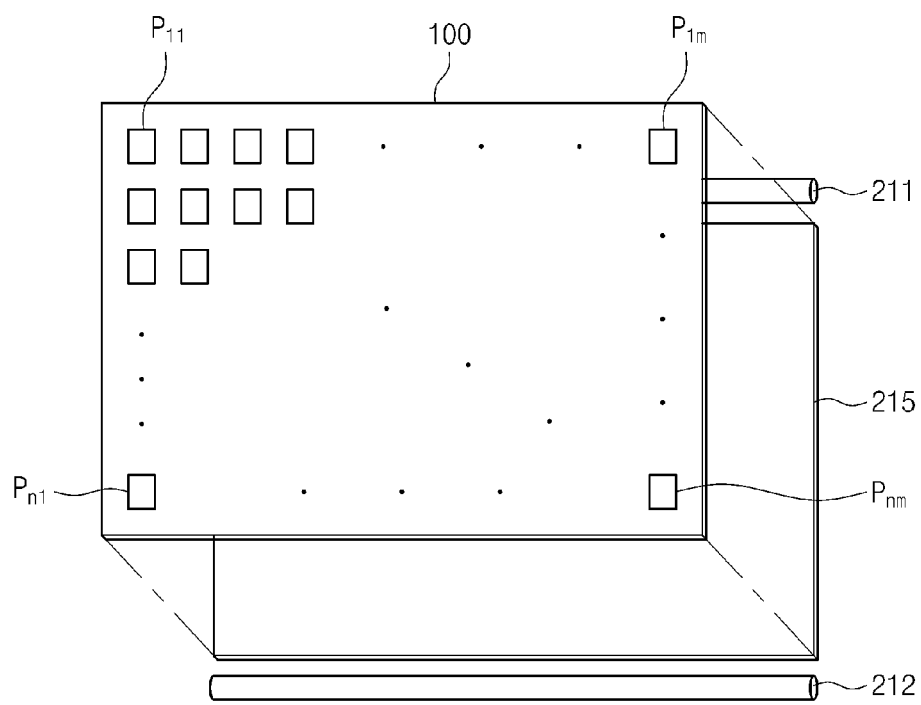
FIG. 2 is an exploded perspective view of exemplary embodiments of a display panel and a backlight unit of FIG. 1.

FIG. 2 is an exploded perspective view of exemplary embodiments of a display panel and a backlight unit of FIG. 1.

Referring to FIGS. 1 and 2, the display panel 100 includes an N row by M column array of pixels $P_{11}$ to Pnm defined therein and each pixel is connected to a corresponding gate line of the gate lines GL1 to GLn and a corresponding data line of the data lines DL1 to DLm. In an exemplary embodiment, each of N and M is an integer greater than or equal to 2.

The backlight unit 210 includes a first light source 211, a second light source 212 and a light guide plate 215. The first light source 211 is disposed adjacent to and parallel to the pixels $P_{11}$ to in a first row, and provides light to the light guide plate 215. The second light source 212 is disposed adjacent to and parallel to the pixels $P_{n1}$ to $P_{nm}$ in an n-th row, and provides light to the light guide plate 215. The first and second light sources 211 and 212 may be a line light source or a point light source, for example, cold cathode fluorescent lamp, external electrode fluorescent lamp, light emitting diode, etc.

Figure 3:
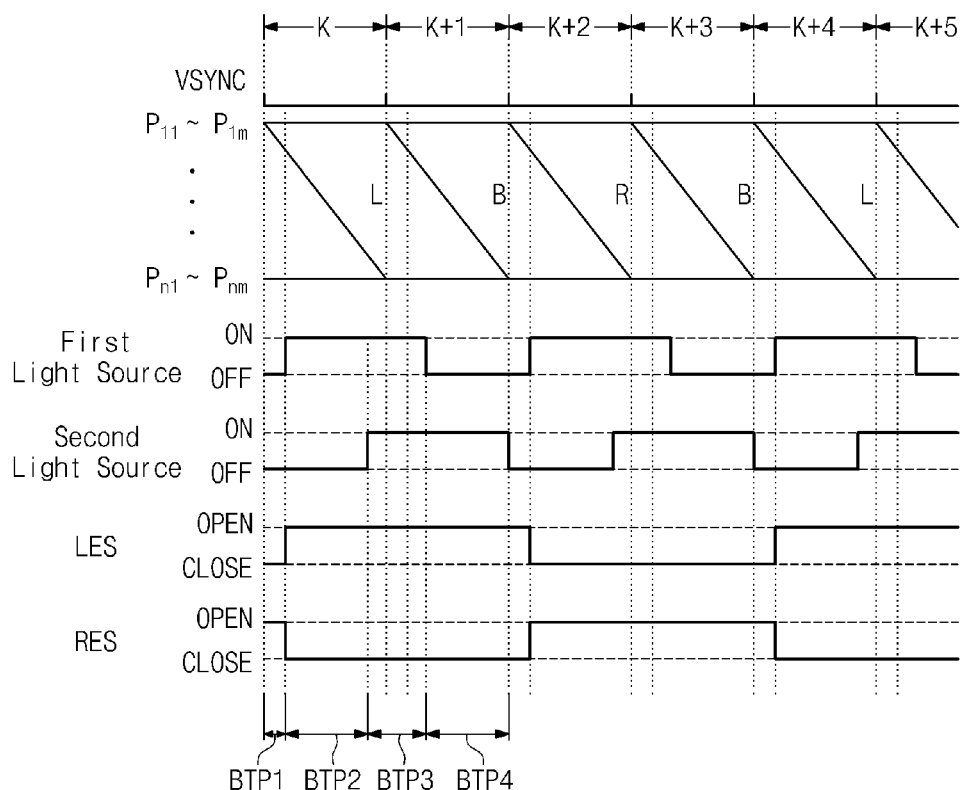
FIG. 3 is a timing diagram showing an exemplary embodiment of a light emitting process of the backlight unit according to the present invention.

FIG. 3 is a timing diagram showing an exemplary embodiment of a light emitting process of the backlight unit according the present invention.

Referring to FIG. 3, a high period of the vertical synchronization signal VSYNC corresponds to a start timing of each frames, e.g., K-th to (K+5)-th frames, and a time interval between two adjacent high periods of the vertical synchronization signal VSYNC corresponds to a time interval of a unit frame. The time interval of the unit frame may vary based on the driving mode of the display apparatus. In an exemplary embodiment, the time interval of the unit frame may be 1/60, 1/120 or 1/240 seconds.

In FIG. 3, a timing point of each frame, at which the image signal LBRB is displayed, is shown below the vertical synchronization signal VSYNC. As shown in FIG. 3, the left-eye image data L is displayed during the K-th frame, the black image data B is displayed during the (K+1)-th frame, the right-eye image data R is displayed during the (K+2)-th frame, and the black image data B is displayed again during the (K+3)-th frame.

Since the image signal LBRB is sequentially applied to the pixels $P_{11}$ to $P_{nm}$ in a row unit based on the sequential driving of the gate lines GL1 to GLn, the image included in the unit frame is displayed at different timing points according to vertical positions of a display surface of the display panel 100. Thus, the display timing of the image signal LBRB is represented as shown in FIG. 3. In an exemplary embodiment, image data for the pixels $P_{11}$ to $P_{1m}$ in a first row are applied to the pixels $P_{11}$ to $P_{1m}$ in the first row immediately after the beginning of one frame, but image data for the pixels $P_{n1}$ to $P_{nm}$ in the n-th row are applied to the pixels $P_{n1}$ to $P_{nm}$ immediately before the beginning of a next frame. The applied image data are charged in the pixels to display the images.

In FIG. 3, blinking timing points of the first and second light sources 211 and 212 are shown below the display timing points of the image signal LBRB.

Referring to FIG. 3, the K-th frame and the (K+1)-th frame are divided into a first blinking time period BTP1, a second blinking time period BTP2, a third blinking time period BTP3 and a fourth blinking time period BTP4. The first and second light sources 211 and 212 are turned off during the first blinking time period BTP1. The first light source 211 is turned on during the second blinking time period BTP2 and the second light source 212 is turned off during the second blinking time period BTP2. The first and second light sources 211 and 212 are turned on during the third blinking time period BTP3. The first light source 211 is turned off during the fourth blinking time period BTP4 and the second light source 212 is turned on during the fourth blinking time period BTP4. The blinking timing pattern of the first and second light source 211 and 212 may be repeated.

The first blinking time period BTP1 may include at least a time period during which the left-eye image data L is applied to the pixels $P_{11}$ to $P_{1m}$ in the first row. The third blinking time period BTP3 may include at least a time period during which the left-eye image data L is applied to the pixels $P_{n1}$ to $P_{nm}$ in the n-th row and a time period during which the black image data B is applied to the pixels $P_{11}$ to $P_{1m}$ in the first row.

The first blinking time period BTP1 may be shorter than each of the second to fourth blinking time periods BTP2 to BTP4. In addition, the third blinking time period BTP3 may be shorter than each of the second and fourth blinking time periods BTP2 and BTP4. In an exemplary embodiment, a time ratio of the first blinking time period BTP1 to the time period corresponding to the unit frame may be less than or equal to about 0.3, and a time ratio of the third blinking time period BTP3 to the time period corresponding to the unit frame may be less than or equal to about 0.6.

During the first blinking time period BTP1, the left-eye image data L and the right-eye image data R are alternately displayed. Accordingly, the first and second light sources 211 and 212 are turned off during the first blinking time period BTP1 to effectively prevent the occurrence of the cross-talk phenomenon between the left-eye image data L and the right-eye image data R.

The pixels included in the row positioned at a center of the display surface of the display panel 100 displays the image during the third blinking time period BTP3. Thus, the first and second light sources 211 and 212 are turned on to compensate the brightness at the center of the display surface of the display panel 100.

In one exemplary embodiment, for example, when the display apparatus 10 is operated at 240 Hz and the time period corresponding to the unit frame is about 4.2 microseconds (μs), the first blinking time period BTP1 is about 1 μs and the third blinking time period BTP3 is about 1.5 μs, thereby preventing the occurrence of the cross-talk phenomenon and compensating for the brightness at the center of the display surface of the display panel 100.

In FIG. 3, open and close timing points of the left-eye shutter LES and the right-eye shutter RES of the shutter glasses 110 are shown below the blinking timing points of the first and second light sources 211 and 212.

Referring to FIG. 3, the left-eye shutter LES is opened and the right-eye shutter RES is closed during the time period in which the left-eye image L is displayed, and the right-shutter RES is opened and the left-eye shutter LES is closed during the time period in which the right-eye image R is displayed. According to embodiments, the open and close timing points may be varied.

Figure 4:
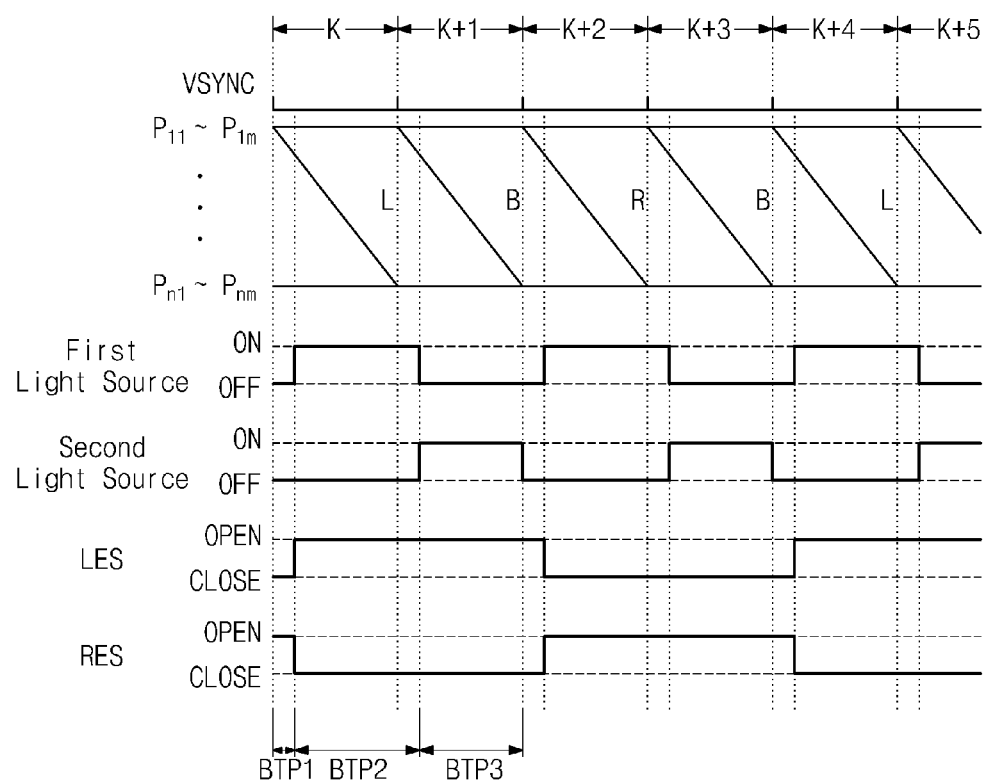
FIG. 4 is a timing diagram showing an alternative exemplary embodiment of the light emitting process of the backlight unit according to the present invention.

FIG. 4 is a timing diagram showing an alternative exemplary embodiment of the light emitting process of the backlight unit according to the present invention. The same or like elements shown in FIG. 4 have been labeled with the same reference characters as used above to describe the exemplary embodiments of the light emitting process shown in FIG. 3, and any repetitive detailed description thereof will hereinafter be omitted or simplified.

Referring to FIG. 4, the K-th and (K+1)-th frames are divided into a first blinking time period BTP1, a second blinking time period BTP2 and a third blinking time period BTP3. The first and second light sources 211 and 212 are turned off during the first blinking time period BTP1. The first light source 211 is turned on during the second blinking time period BTP2 and the second light source 212 is turned off during the second blinking time period BTP2. In addition, the first light source 211 is turned off during the third blinking time period BTP3 and the second light source 212 is turned on during the third blinking time period BTP3. The blinking timing pattern of the first and second light sources 211 and 212 may be repeated in the following frames.

The first blinking time period BTP1 may include at least a time period during which the left-eye image data L is applied to the pixels $P_{11}$ to $P_{1m}$ in the first row, and the second blinking time period BTP2 may include at least a time period during which the black image data B is applied to the pixels $P_{11}$ to $P_{1m}$ in the first row. In addition, each of the first, second and third blinking time period BTP1, BTP2 and BTP3 may be shorter than the time period corresponding to the unit frame. In an exemplary embodiment, the time ratio of the first blinking time period BTP1 to the time period corresponding to the unit frame may be less than or equal to about 0.3.

As described above, during the first blinking time period BTP1, the left-eye image data L and the right-eye image data R are alternately displayed. Accordingly, the first and second light sources 211 and 212 are turned off during the first blinking time period BTP1, thereby preventing the occurrence of the cross-talk phenomenon between the left-eye image data L and the right-eye image data R.

In such an embodiment, the display apparatus 10 may employ a light guide plate having the following properties to compensate the brightness at the center of the display surface of the display panel 10.

Figure 5:
FIG. 5 is a graph showing position versus brightness ratio of an exemplary embodiment of a light guide plate according to the present invention.

FIG. 5 is a graph showing position versus brightness ratio of an exemplary embodiment of a light guide plate according to the present invention.

Referring to FIG. 5, a vertical axis corresponds to a vertical position on the light guide plate 215 when a lowermost end of the light guide plate 215 is denoted as 0 (zero) and an uppermost end of the light guide plate 215 is denoted as 1 (one), and a horizontal axis corresponds to a brightness ratio of the light exiting from the light guide plate 215 to a reference brightness when the first and second light sources 211 and 212 are turned on.

As shown in FIG. 5, the brightness of the light exiting from the center portion of the light guide plate 215 is higher than the brightness of the light exiting from portions of the light guide plate 215 adjacent to the first and second light sources 211 and 212, such that the brightness at the center of the display surface of the display panel 100 may be compensated.

Figure 6A:
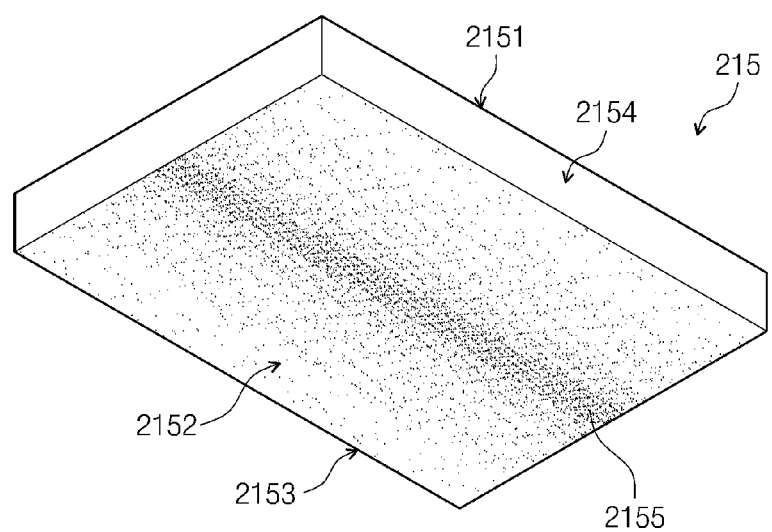
FIG. 6A is a perspective view of an exemplary embodiment of the light guide plate having brightness characteristics corresponding to the brightness characteristics in FIG. 5.
Figure 6B:
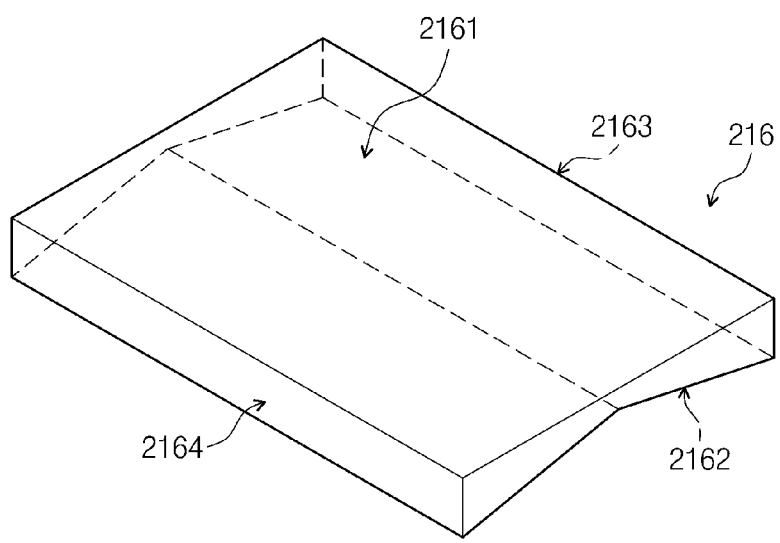
FIG. 6B is a perspective view of an alternative exemplary embodiment of the light guide plate having the brightness characteristics corresponding to the brightness characteristics in FIG. 5.

FIG. 6A is a perspective view of an exemplary embodiment of a light guide plate having brightness characteristics corresponding to the brightness characteristics shown in FIG. 5 according to the present invention, and FIG. 6B is a perspective view of an alternative exemplary embodiment of the light guide plate having the brightness characteristics corresponding to the brightness characteristics shown in FIG. 5 according to the present invention.

Referring to FIG. 6A, the light guide plate 215 may have a rectangular plate shape. The light guide plate 215 includes a first surface 2151 from which the light exits toward the display panel 100, a second surface 2152 facing the first surface 2151, a third surface 2153 adjacent to the first light source 211, and a fourth surface 2154 adjacent to the second light source 212. In an exemplary embodiment, the light guide plate 215 may further include a plurality of reflecting members arranged on the second surface 2152 to reflect the light provided from the first and second light sources 211 and 212 to the first surface 2151.

In FIG. 6A, a density of the reflecting members 2155 in the center portion of the light guide plate 215 is higher than a density of the reflecting members 2155 in portions of the light guide plate 215 adjacent to the third and fourth surfaces 2153 and 2154. Thus, the light guide plate 215 may have a brightness property corresponding to the brightness characteristics shown in FIG. 5 by controlling the density of the reflecting members 2155.

Referring to FIG. 6B, the light guide plate 216 has a rectangular-like shape in a plan view and includes a first surface 2161 from which the light exits toward the display panel 100, a second surface 2162 facing the first surface 2161, a third surface 2163 adjacent to the first light source 211, and a fourth surface 2164 adjacent to the second light source 212.

The second surface 2162 may be non-planar. In an exemplary embodiment, the second surface 2162 has a V shape. That is, the light guide plate 216 has a thickness less in a center portion between the first and second light sources 211 and 212 than in portions adjacent to the first and second light sources 211 and 212. Accordingly, the light guide plate 216 may have the brightness property corresponding to the brightness characteristics shown in FIG. 5 by controlling the thickness thereof.

Figure 7:
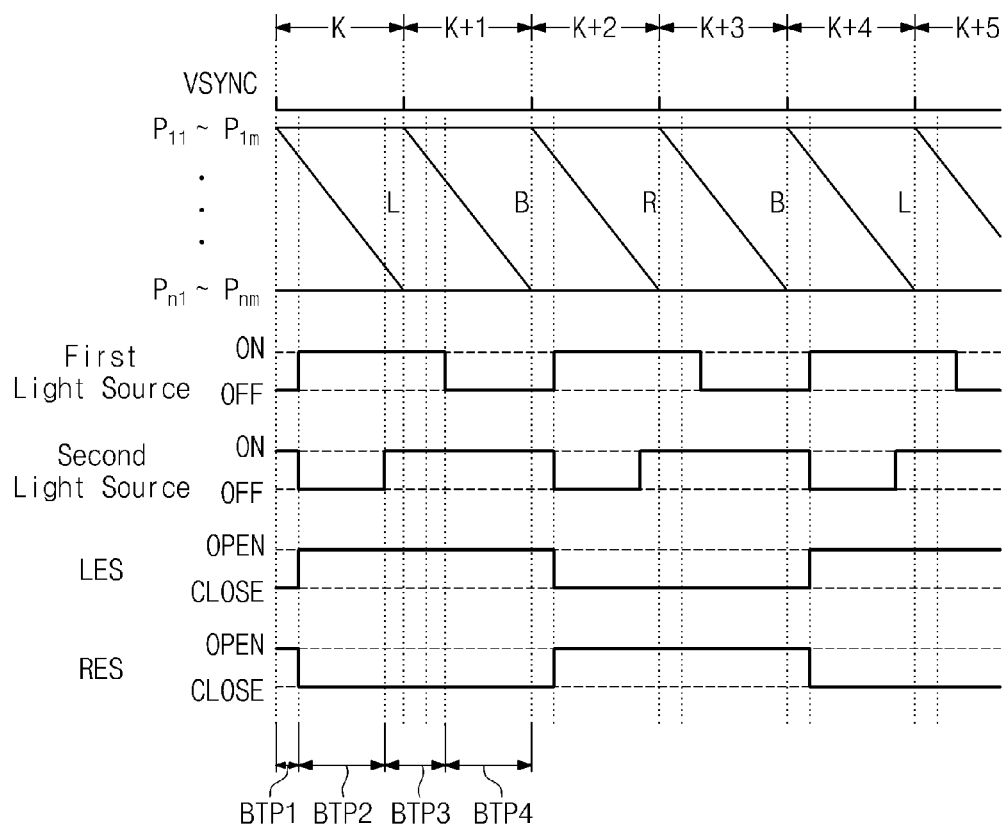
FIG. 7 is a timing diagram showing an alternative exemplary embodiment of the light emitting process of the backlight unit according to the present invention.

FIG. 7 is a timing diagram showing an alternative exemplary embodiment of the light emitting process of the backlight unit according to the present invention.

Referring to FIG. 7, the K-th and (K+1)-th frames are divided into a first blinking time period BTP1, a second blinking time period BTP2, a third blinking time period BTP3 and a fourth blinking time period BTP4. The third blinking time period BTP3 may include at least a time period during which the left-eye image data L is applied to the pixels $P_{n1}$ to $P_{nm}$ in the n-th row and a time period during which the black image data B is applied to the pixels $P_{11}$ to $P_{1m}$ in the first row. In an exemplary embodiment, a time ratio of the third blinking time period BTP3 to the time period corresponding to the unit frame may be about less than or equal to about 0.6.

The first light source 211 is turned off during the first blinking time period BTP1 and the second light source 212 is turned on during the first blinking time period BTP1. The first light source 211 is turned on during the second blinking time period BTP2 and the second light source 212 is turned off during the second blinking time period BTP2. In addition, the first and second light sources 211 and 212 are turned off during the third blinking time period BTP3. The first light source 211 is turned off during the fourth blinking time period BTP4 and the second light source 212 is turned on during the fourth blinking time period BTP4. The blinking timing pattern of the first and second light sources 211 and 212 may be repeated in the following frames.

As described above, the pixels included in the row positioned at the center of the display surface of the display panel 100 displays the image during the third blinking time period BTP3. Thus, the first and second light sources 211 and 212 are turned on to compensate the brightness at the center of the display surface of the display panel 100.

Figure 8:
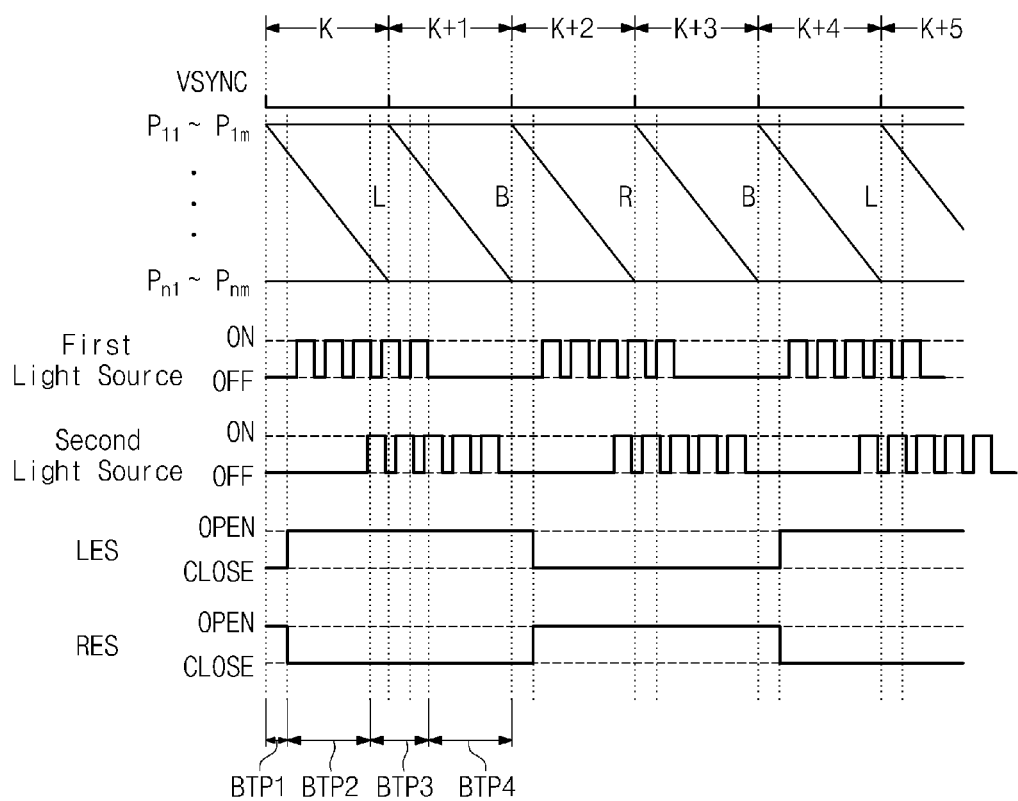
FIG. 8 is a timing diagram showing an alternative exemplary embodiment of the light emitting process of the backlight unit.

FIG. 8 is a timing diagram showing an alternative exemplary embodiment of the light emitting process of the backlight unit according to the present invention.

In FIG. 8, the first to fourth blinking time periods BTP1 to BTP4 are substantially the same as the first to fourth blinking time periods in FIG. 3, but the time period during which the first and second light sources 211 and 212 are turned on by generating a plurality of turn-on and turn-off signals. When the first and second light sources 211 and 212 are in turn-on state using the turn-on and turn-off signals, horizontal stripes due to brightness difference, which is displayed on the display surface of the display panel 100, may be effectively prevented from occurring. In an exemplary embodiment, the time ratio of the turn-off state to the turn-on state in the turn-on and turn-off signals may vary based on the brightness characteristics of the display panel 100.

The timing diagram shown in FIG. 8 corresponds to the timing diagram shown in FIG. 3, but the time period during which the first and second light sources 211 and 212 are turned on may be realized by the turn-on and turn-off signals.

Figure 9:
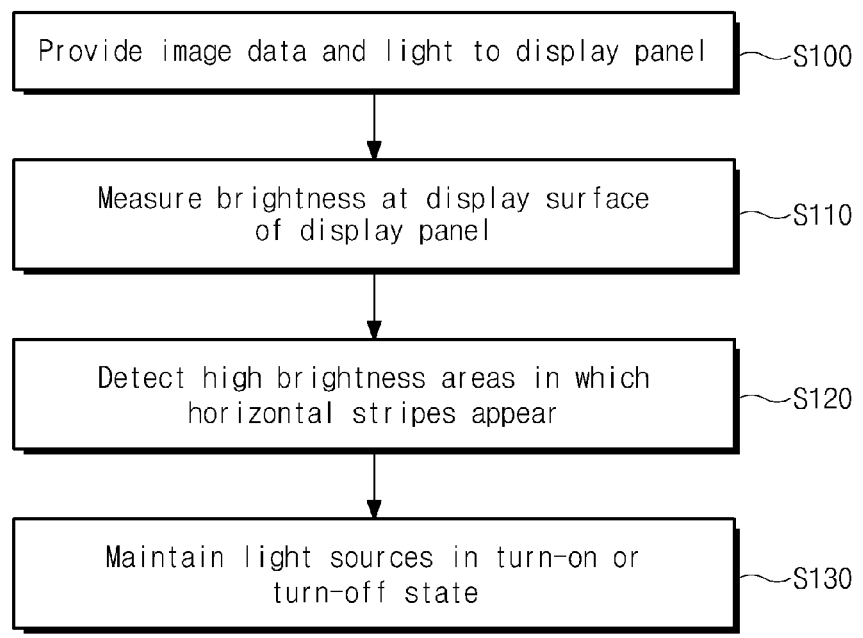
FIG. 9 is a flowchart showing an exemplary embodiment of a method of driving a display apparatus according to the present invention.

FIG. 9 is a flowchart showing an exemplary embodiment of a method of driving a display apparatus according to the present invention.

Referring back to FIG. 2, the display apparatus 10 includes the display panel 100 including the N row by M column array of the pixels $P_{11}$ to $P_{nm}$ (each of the N and M is an integer greater than or equal to 2) and the first and second light sources 211 and 212 that provide the light to the display panel 100. The driving method of the display apparatus 10 shown in FIG. 9 may be applied to display both the 2-D image and the 3-D image.

Referring now to FIG. 9, the image data with the same gray scale is applied to each pixel of the display panel 100 and the light is provided to the display panel 100 (S100). Then, the brightness at the display surface of the display panel 100 is measured (S110).

After that, the measured result of the brightness is analyzed to detect high brightness areas, e.g., the horizontal stripe areas substantially parallel to the pixels in a same row of the pixels P11 to Pnm and have the brightness higher than a predetermined brightness, e.g., an average brightness of the display surface (S120).

When the high brightness horizontal stripe areas are detected, the first and second light sources 211 and 212 are maintained in turn-off state during a predetermined time in the time period in which the image data is displayed through the pixels corresponding to the high brightness horizontal stripe areas, and the first and second light sources 211 and 212 are maintained in turn-on state during a time period except for the predetermined time of the time period in which the image data is displayed through the pixels corresponding to the high brightness horizontal stripe areas (S130).

In such an embodiment, the high brightness horizontal stripe areas are effectively prevented from being perceived by a user.

Figure 10A:
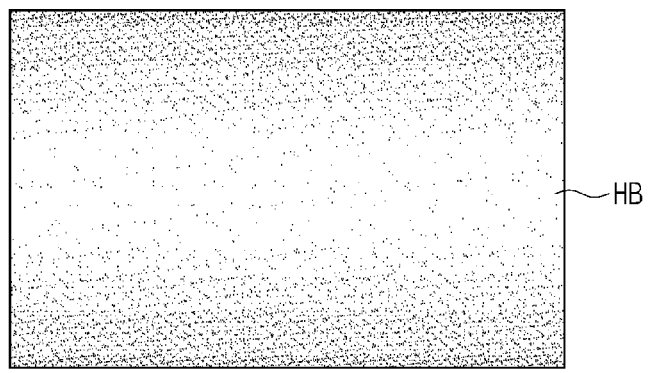
FIG. 10A is a top plan view of an exemplary embodiment of a display panel having high-brightness horizontal stripes on a surface thereof.
Figure 10B:
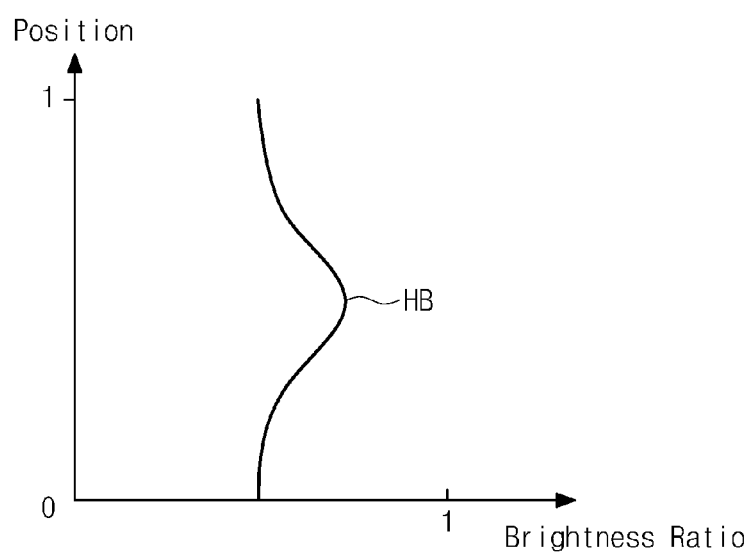
FIG. 10B is a graph showing position versus brightness vertical ratio according to vertical positions on a display surface of the display panel of FIG. 10A.
Figure 10C:
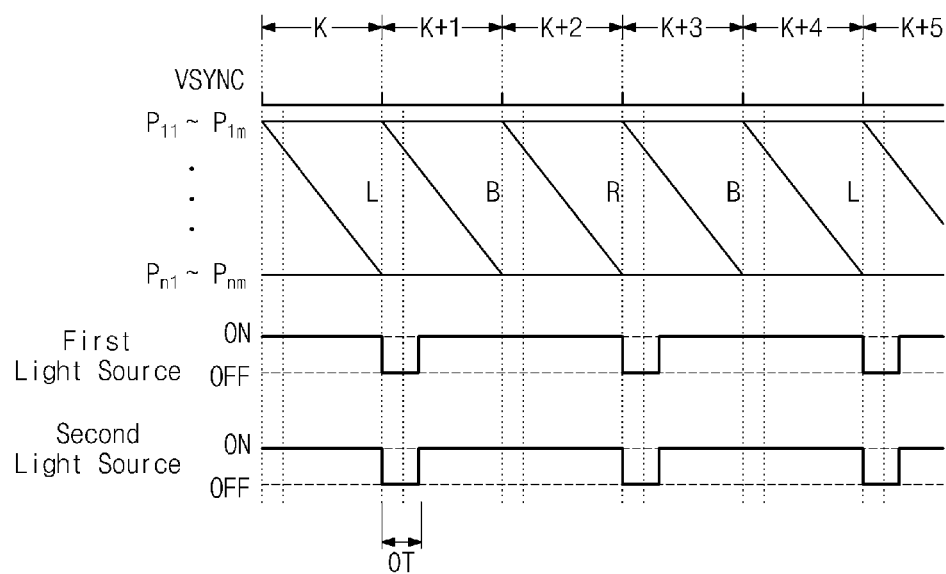
FIG. 10C is a timing diagram showing an exemplary embodiment of a method of driving the display panel, in which the high-brightness horizontal stripes are prevented from being perceived of FIG. 10A.

FIG. 10A is a top plan view of an exemplary embodiment of the display panel having high-brightness horizontal stripes on a surface thereof, FIG. 10B is a graph showing position versus brightness ratio according to vertical positions on a display surface of the display panel of FIG. 10A, and FIG. 10C is a timing diagram showing an exemplary embodiment of the method of driving the display panel of FIG. 10A, in which the high-brightness horizontal stripes are prevent from being perceived.

Referring to FIGS. 10A and 10B, when the image data having the same brightness is applied to the display panel 100, the horizontal stripes HB having the higher brightness than brightness of the other areas on the display surface appear on the center portion of the display surface.

In FIG. 10C, the 3-D image signal L and R and a black signal B used to display a black screen B are alternately applied to the display panel 100, but in some exemplary embodiments, a 2-D image signal and a black signal used to display a black screen may be alternately applied to the display panel.

Referring to FIG. 10C, when the first and second light sources 211 and 212 are turned off during a predetermined time OT of the time period in which the image is displayed through the pixels corresponding to the high brightness horizontal stripe area HB, the high brightness horizontal stripes HB is effectively prevented from appearing on the display surface. In an exemplary embodiment, the predetermined time OT may be determined between a start point, at which the image data is input to the pixels corresponding to the high brightness horizontal stripe area HB, and an end point, at which the input of the image data stops.

FIG. 10C shows the blinking timing points when the display apparatus 10 includes the first light source 211 adjacent to the pixels P11 to P1m in the first row and the second light source 212 adjacent to the pixels Pn1 to Pnm. In an exemplary embodiment, the display apparatus 10 may further include the light source arranged adjacent to left and right sides of the display panel 100 in addition to the first and second light sources 211 and 212.

Figure 11A:
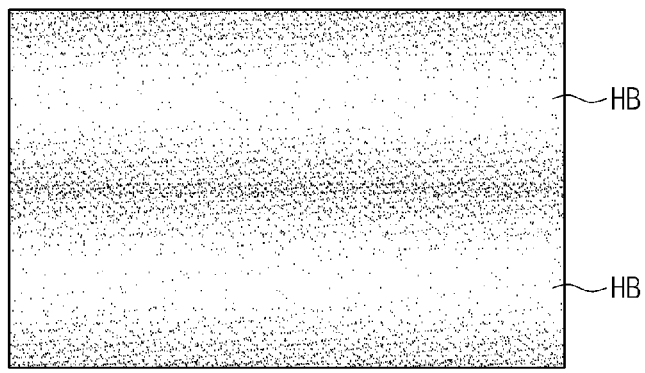
FIG. 11A is a top plan view of an alternative exemplary embodiment of the display panel having high-brightness horizontal stripes on a surface thereof.
Figure 11B:
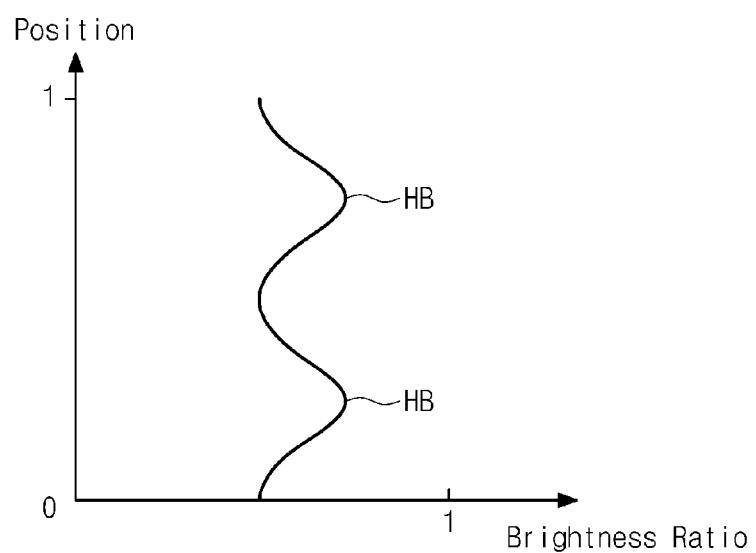
FIG. 11B is a graph showing position versus brightness ratio according to vertical positions on a display surface of the display panel of FIG. 11A.
Figure 11C:
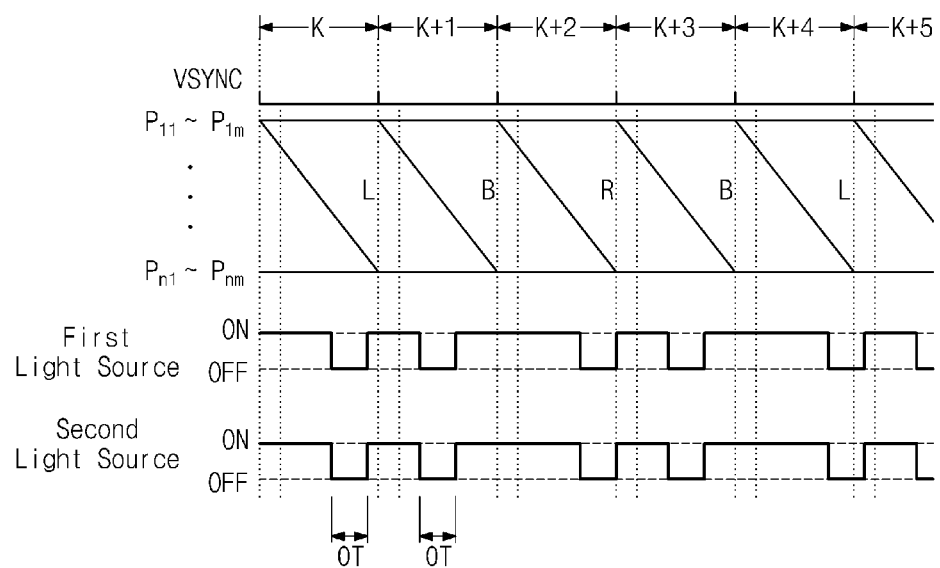
FIG. 11C is a timing diagram showing an exemplary embodiment of a method of driving the display panel, in which the high-brightness horizontal stripes of FIG. 11A are prevented from being perceived.

FIG. 11A is a top plan view of an alternative exemplary embodiment of the display panel having high-brightness horizontal stripes on a surface thereof, FIG. 11B is a graph showing position versus brightness according to vertical positions on a display surface of the display panel of FIG. 11A, and FIG. 11C is a timing diagram showing an exemplary embodiment of a method of driving the display panel of FIG. 11A, in which the high-brightness horizontal stripes are prevented from being perceived.

Referring to FIGS. 11A and 11B, when the image data having the same brightness is applied to the display panel 100, the horizontal stripes HB, which has the higher brightness than brightness of the other areas on the display surface, appear on an area between an upper portion and the center portion of the display surface and an area between the center portion and a lower portion of the display surface.

Referring to FIG. 11C, when the first and second light sources 211 and 212 are turned off during a predetermined time OT of the time period in which the image is displayed through the pixels corresponding to the high brightness horizontal stripe area HB, e.g., the areas between the upper portion and the center portion and between the center portion and the lower portion, the high brightness horizontal stripes HB is effectively prevented from appearing on the display surface.

Figure 12A:
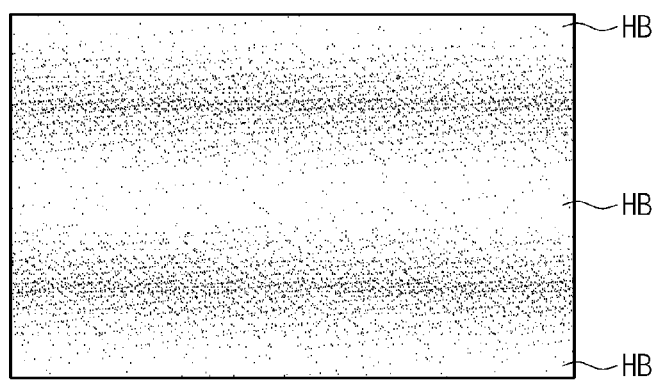
FIG. 12A is a top plan view showing another example of high-brightness horizontal stripes on a surface of an exemplary embodiment of the display panel.
Figure 12B:
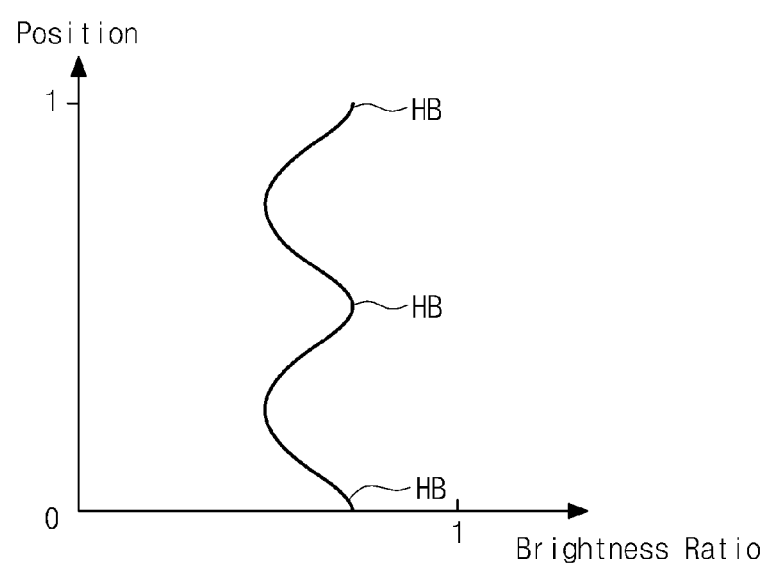
FIG. 12B is a graph showing position versus brightness ratio according to vertical positions on a display surface of the display panel of FIG. 12A.
Figure 12C:
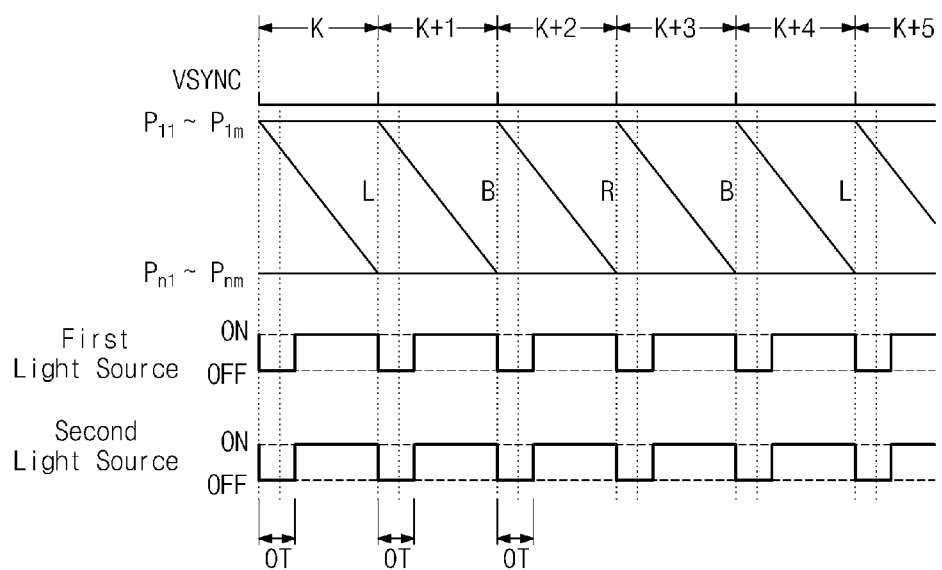
FIG. 12C is a timing diagram showing an exemplary embodiment of a method of driving the display panel, in which the high-brightness horizontal stripes are prevented from being perceived of FIG. 12A.

FIG. 12A is a top plan view of an alternative exemplary embodiment of the display panel having high-brightness horizontal stripes on a surface thereof, FIG. 12B is a graph showing position versus brightness ratio according to vertical positions on a display surface of the display panel of FIG. 12A, and FIG. 12C is a timing diagram showing an exemplary embodiment of the method of driving the display panel of FIG. 12A, in which the high-brightness horizontal stripes are prevent from being perceived.

Referring to FIGS. 12A and 12B, when the image data having the same brightness is applied to the display panel 100, the horizontal stripes HB having the higher brightness than the brightness of the other areas on the display surface appear on the upper area, the center area and the lower area of the display surface except for the upper area, the center area and the lower area.

Referring to FIG. 12C, when the first and second light sources 211 and 212 are turned off during a predetermined time OT of the time period in which the image is displayed through the pixels corresponding to the high brightness horizontal stripe area HB, e.g., the upper, center, and lower areas, the high brightness horizontal stripes HB is effectively prevented from appearing on the display surface.

Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. A display apparatus comprising:
   a display panel comprising n row by m column array of pixels, wherein the display panel sequentially drives the pixels from pixels in a first row to pixels in an n-th row to display an image, and each of n and m is an integer greater than or equal to 2;
   a panel driving circuit which applies at least one of a first image data, a second image data, a third image data and a fourth image data to the display panel during a frame unit such that the first image data, the second image data, the third image data and the fourth image data are sequentially applied to the display panel;
   a backlight unit which provides light to the display panel, wherein the backlight unit comprises:
   a first light source disposed substantially parallel to and adjacent to the pixels in the first row; and a second light source disposed adjacent to the pixels in the n-th row and opposite to the first light source; and a backlight control circuit which divides each of a first time period and a second time period into a first blinking time period, a second blinking time period and a third blinking time period, and applies a control signal to the backlight unit to control a blinking timing of the first light source and the second light source, wherein the first time period corresponds to two frames during which the first image data and the second image data are applied, and the second time period corresponds to two frames during which the third image data and fourth image data are applied, wherein the first light source and the second light source are turned off during the first blinking time period, the first light source is turned on during the second blinking time period, the second light source is turned off during the second blinking time period, the first light source is turned off during the third blinking time period, the second light source is turned on during the third blinking time period, the first light source is turned off at a same time that the second light source is turned on during the third blinking time period, and the first blinking time period is shorter than each of the second blinking time period and the third blinking time period.

2. The display apparatus of claim 1, wherein the first image data corresponds to a left-eye image data, the second image data corresponds to a black image, the third image data corresponds to a right-eye, and the fourth image data corresponds to the black image.

3. The display apparatus of claim 2, wherein the first blinking time period of the first time period comprises at least a time period during which the first image data is applied to the pixels in the first row, the first blinking time period of the second time period comprises at least a time period during which the third image data is applied to the pixels in the first row, the second blinking time period of the first time period comprises at least a time period during which the second image data is applied to the pixels in the first row, and the second blinking time period of the second time period comprises at least a time period during which the fourth image data is applied to the pixels in the first row.

4. The display apparatus of claim 3, wherein each of the first, second, and third blinking time periods is shorter than the frame unit.

5. The display apparatus of claim 3, wherein a time ratio of the first blinking time period to a time period corresponding to the frame unit is less than or equal to about 0.3.

6. The display apparatus of claim 1, wherein each of the first image data and third image data correspond to an image, and each of the second image data and the fourth image data correspond to a black image.

7. The display apparatus of claim 1, wherein the backlight unit further comprises a light guide plate disposed between the first light source and the second light source, wherein the light guide plate guides the light to the display panel, and wherein when the first light source and the second light source are turned on, a brightness of the light from the light guide plate to a center portion of the display panel between the first light source and the second light source is higher than a brightness of light from the light guide plate to portions of the display panel adjacent to the first light source and the second light sources, respectively.

8. The display apparatus of claim 7, wherein the light guide plate comprises:

a first surface from which the light exits toward the display panel;

a second surface facing the first surface; and a plurality of reflecting members disposed on the second surface, wherein the plurality of reflecting members reflects the light from the first light source and the second light source to the display panel, and a density of reflecting members in the center portion of the light guide plate is higher than a density of reflecting members in portions adjacent to the first light source and the second light source.

* * * * *